(12) United States Patent
Patwardhan et al.

(10) Patent No.: US 10,809,945 B2
(45) Date of Patent: Oct. 20, 2020

(54) METHOD AND SYSTEM FOR COMPRESSION AWARE CHUNKING OF BACKUP STREAMS

(71) Applicant: EMC IP Holding Company LLC, Hopkinton, MA (US)

(72) Inventors: Kedar Shrikrishna Patwardhan, Irvine, CA (US); Rajesh K. Nair, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 69 days.

(21) Appl. No.: 16/053,707

(22) Filed: Aug. 2, 2018

(65) Prior Publication Data

US 2020/0042253 A1    Feb. 6, 2020

(51) Int. Cl.
*G06F 3/06* (2006.01)

(52) U.S. Cl.
CPC .......... *G06F 3/0661* (2013.01); *G06F 3/0608* (2013.01); *G06F 3/0641* (2013.01); *G06F 3/0644* (2013.01); *G06F 3/0673* (2013.01)

(58) Field of Classification Search
CPC .... G06F 3/0661; G06F 3/0608; G06F 3/0641; G06F 3/0644; G06F 3/0673
See application file for complete search history.

(56) References Cited

U.S. PATENT DOCUMENTS

| | | | |
|---|---|---|---|
| 6,374,336 B1* | 4/2002 | Peters | G06F 11/1076 711/167 |
| 2011/0227764 A1* | 9/2011 | Shalev | H03M 7/30 341/51 |
| 2016/0283165 A1* | 9/2016 | Robinson | G06F 3/061 |

* cited by examiner

*Primary Examiner* — Ryan Bertram
*Assistant Examiner* — Edmund H Kwong
(74) *Attorney, Agent, or Firm* — Workman Nydegger (57) ABSTRACT

One example method includes reading a data chunk from a data stream, compressing the data chunk, and calculating a chunk delta. When the chunk delta is greater than zero, the compressed data chunk is appended to an incomplete data chunk. When the chunk delta is zero or less, the boundaries of a completed and compressed data chunk having a size at least as large as a minimum size are declared.

20 Claims, 4 Drawing Sheets

METHOD AND SYSTEM FOR COMPRESSION AWARE CHUNKING OF BACKUP STREAMS

FIELD OF THE INVENTION

Embodiments of the present invention generally relate to data protection. More particularly, at least some embodiments of the invention relate to systems, hardware, software, computer-readable media, and methods directed to various processes for chunking a backup stream based in part upon the compressibility of the backup stream.

BACKGROUND

Cloud storage solutions have proven useful for a variety of enterprises, and cloud storage providers have found various ways to bill users for the storage services. One prominent approach is to charge users based on an incremental chunk size. For example, some cloud storage services may charge users a certain amount for each 128 KB chunk of data, or portion thereof. However, the chunking processes typically employed by customers on their backup streams commonly produce data chunks that are smaller than 128 KB. As a result, the customer does not receive full value for its storage expenditures. More specifically, the customer data is chunked and then compressed, resulting in a final chunk size that is not optimal for target storage pricing.

To illustrate, a storage price of $1/128 KB indicates a nominal storage rate of $0.0078/KB. However, if the customer stores a chunk that is a fractional amount of the nominal 128 KB chunk size upon which charging is based, such as a chunk that is only 64 KB, the customer is still charged $1 to store that chunk. Thus, for this fractional chunk, the customer pays an effective rate of $1/64 KB ($0.0156/KB) for the 64 KB chunk, that is, twice the rate that the customer paid for storage of the 128 KB chunk. As this example illustrates, the cost impact can be substantial for a customer who stores millions of chunks that are smaller than the nominal size upon which pricing is based.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data protection. More particularly, at least some embodiments of the invention relate to systems, hardware, software, computer-readable media, and methods directed to various processes for chunking a backup stream based in part upon the compressibility of the backup stream.

In general, embodiments of the invention employ data chunking and data compression together in order to create data chunks of a consistent size. That is, the chunk boundaries are not simply declared based on markers, symbols, or codes, in the data stream, but the compressibility of the data stream is also taken into account when the data stream is chunked. More specifically, because the extent to which data is compressible typically varies according to the type of data involved, embodiments of the invention operate to adjust the chunking boundaries dynamically in relation to compressibility of the incoming backup stream. Thus, embodiments of the invention are able to identify and declare chunk boundaries in such a way that a final compressed chunk size is at least a certain minimum size. Consistently, the final compressed chunk size is tunable, that is, can be adjusted so that the chunks are at least as large as whatever size a user may choose to specify.

Advantageously then, embodiments of the invention may provide various benefits relative to conventional systems and methods. To illustrate, embodiments of the invention may enable creation of a chunked and compressed data stream that comprises, or consists of, data chunks of generally uniform size, or data chunks that at least meet a minimum size standard. As well, embodiments of the invention may provide for relatively more efficient use of storage services and storage space by an entity. As the foregoing examples illustrate, embodiments of the invention may improve the operation of a computing system, or element of a computing system, such as by providing for relatively uniform chunk sizes in a backup data stream. Aspects of the disclosed processes and methods are discussed below in connection with various illustrative examples.

A. Aspects of an Example Operating Environment

The following is a discussion of aspects of example operating environments for various embodiments of the invention. This discussion is not intended to limit the scope of the invention, or the applicability of the embodiments, in any way.

At least some embodiments may be employed in connection with a data protection environment, such as the Dell-EMC DataDomain environment, which can implement backup, archive, and/or disaster recovery, functions. However, the scope of the invention is not limited to this example data protection environment.

The data protection environment may take the form of a cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes, storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

Figure 1:
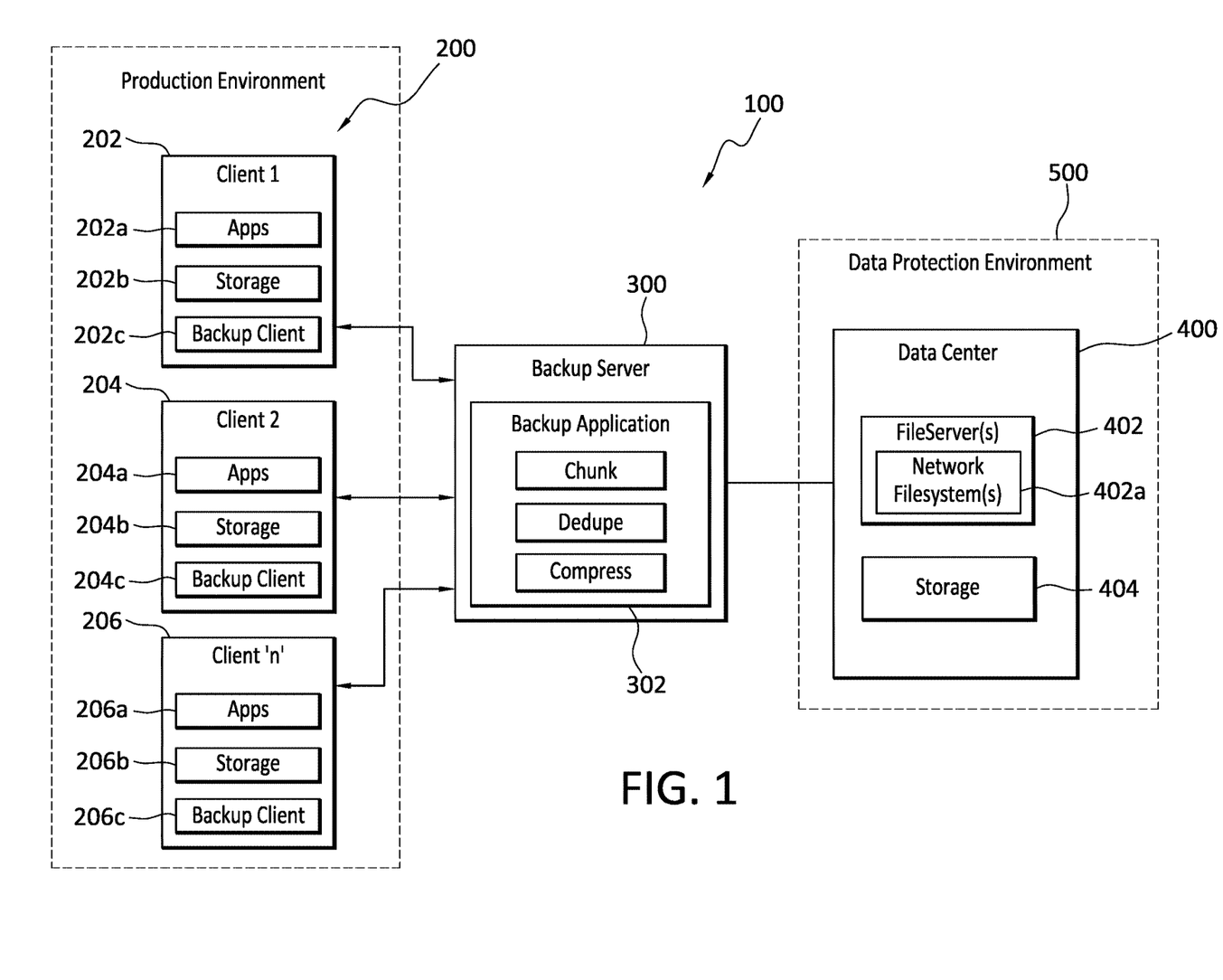
FIG. 1 discloses aspects of an example operating environment for some embodiments of the invention.

With particular reference now to FIG. 1, an example operating environment 100 may include a plurality of clients 200, such as clients 202, 204 and 206. Each of the clients 200 may host one or more applications 202a, 204a and 206a, respectively, that create new and/or modified data that is desired to be protected. As such, the clients 200 are examples of host devices. One, some, or all, of the clients 200 may take the form of a VM, although that is not required. In general, the VM is a virtualization of underlying hardware and/or software and, as such, one or more of the clients 200 may include or otherwise be associated with various underlying components.

As well, each of the clients 200 may include respective local storage 202b, 204b and 206b. The local storage 202b, 204b and 206b can be used to store data, which may be backed up as described below. The backup data can be restored to local storage 202b, 204b and 206b. The clients 200 may each also include a respective backup client application 202c, 204c and 206c. As shown in FIG. 1, the clients 200 may collectively form a portion of a Production Environment in which new and modified production data is generated by applications such as applications 202a, 204a and 206a.

With continued reference to FIG. 1, the example operating environment 100 may further include one or more backup servers, such as a backup server 300. In some embodiments, the backup server 300 may be an EMC Corp. Avamar server or an EMC Corp. Networker server, although no particular server is required for embodiments of the invention. As well, in some embodiments, the backup server 300 may be an element of the data protection environment 500 or, more particularly, an element of the datacenter 400.

The backup server 300 may include a backup application 302 that cooperates with one or more of the backup clients 202c, 204c, or 206c to backup clients 202, 204 and 206 data and/or applications 202a, 204a, and 206a, at a datacenter 400 of a data protection environment 500 that may, in some embodiments, take the form of a cloud storage environment. One example of such a cloud storage environment is the Amazon Simple Storage Service (S3) storage environment. The backup application 302 may also cooperate with one or more of the backup clients 202c, 204c, or 206c to restore backed up client 202, 204 and 206 data from the datacenter 400 to the clients 202, 204 and 206. The backup application 302 may include and/or operate in connection with a dynamic data compressor.

As indicated in FIG. 1, at least some embodiments of the backup application 302 may chunk, deduplicate, and compress, backup data before streaming the backup data to the datacenter 400 for storage. In other embodiments, such as where the backup server 300 is located at the datacenter 400 for example, the chunking, deduplication, and compression, may take place at the datacenter 400. In still other embodiments, a backup client such as backup clients 202c, 204c or 206c, may be operable to chunk, deduplicate, and compress, backup data before streaming that backup data to another entity, such as the datacenter 400, or the backup server 300. More generally, chunking, deduplication, and compression of data can take place anywhere in the operating environment 100, and at any time before storage of the data at the datacenter. As such, the scope of the invention is not limited to implementation of these functionalities by any particular computing entity, or group of computing entities.

The data protection environment 500 may be implemented as a Dell-EMC DataDomain data protection environment, although that is not required. The data protection environment 500 may support various data protection processes, including data replication, cloning, data backup, and data restoration, for example. As indicated, the data protection environment 500, may comprise or consist of datacenter 400, which may be a cloud storage datacenter in some embodiments, that includes one or more network fileservers 402 that are accessible, either directly or indirectly, by the clients 200. Each of the network fileservers 402 can include one or more corresponding network filesystems 402a, and/or portions thereof.

The datacenter 400 may include and/or have access to storage 404, such as a data storage array for example, that communicates with the network filesystems 402a. In general, the storage 404 is configured to store client 200 data backups that can be restored to the clients 200 in the event that a loss of data or other problem occurs with respect to the clients 200. The term data backups is intended to be construed broadly and includes, but is not limited to, partial backups, incremental backups, full backups, clones, snapshots, continuous replication, and any other type of copies of data, and any combination of the foregoing. Any of the foregoing data backups may, or may not, be deduplicated, such as by a backup application and/or at a datacenter.

The storage 404 can employ, or be backed by, a mix of storage types, such as Solid State Drive (SSD) storage for transactional type workloads such as databases and boot volumes whose performance is typically considered in terms of the number of input/output operations (IOPS) performed. Additionally, or alternatively, the storage 404 can use Hard Disk Drive (HDD) storage for throughput intensive workloads that are typically measured in terms of data transfer rates such as MB/s.

B. Example Host and Server Configurations

Figure 2:
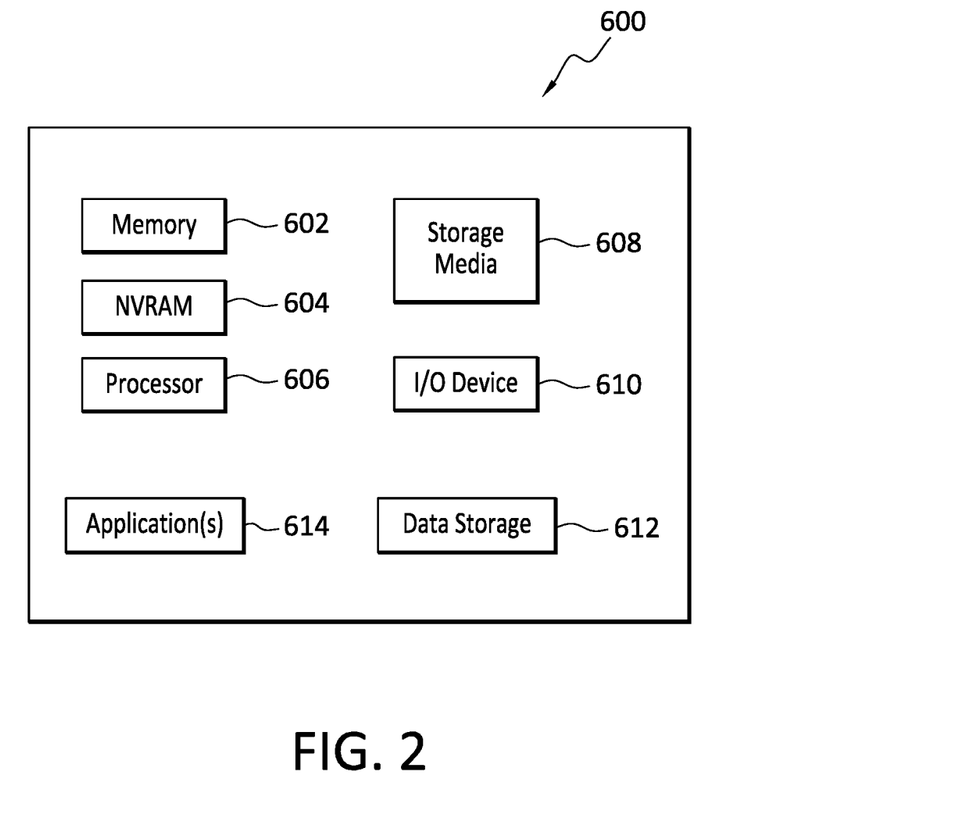
FIG. 2 discloses aspects of an example host configuration.

With reference briefly now to FIG. 2, any one or more of the clients 200, backup server 300, file server 402, storage 404, and datacenter 400, may comprise, consist of, or be implemented as, a physical computing device, one example of which is denoted at 600. As well, where any of the aforementioned elements comprise or consist of a VM, that VM may constitute a virtualization of any combination of the physical components disclosed in FIG. 2.

In the example of FIG. 2, the physical computing device 600 includes a memory 602 which can include one, some, or all, of random access memory (RAM), non-volatile random access memory (NVRAM) 604, read-only memory (ROM), and persistent memory, one or more hardware processors 606, non-transitory storage media 608, IO device 610, and data storage 612. One or more of the memory components 602 of the physical computing device can take the form of solid state device (SSD) storage. As well, one or more applications 614 are provided that comprise executable instructions. Such executable instructions can take various forms including, for example, executable instructions for performing any combination of one or more of the following processes: chunking a data stream; deduplicating a data stream; compressing a data stream; chunking a data stream based on compressibility of the data stream; setting a minimum chunk size; chunking a data stream so that all the chunks of the data stream are at least a minimum size; adjusting or tuning a minimum size of a chunk of a data stream; declaring a chunk boundary based on compressibility of the chunked data. Such executable instructions may also perform, either in whole or in part, any of the other processes disclosed herein.

C. Aspects of Example Compressed and Chunked Data

Figure 3:
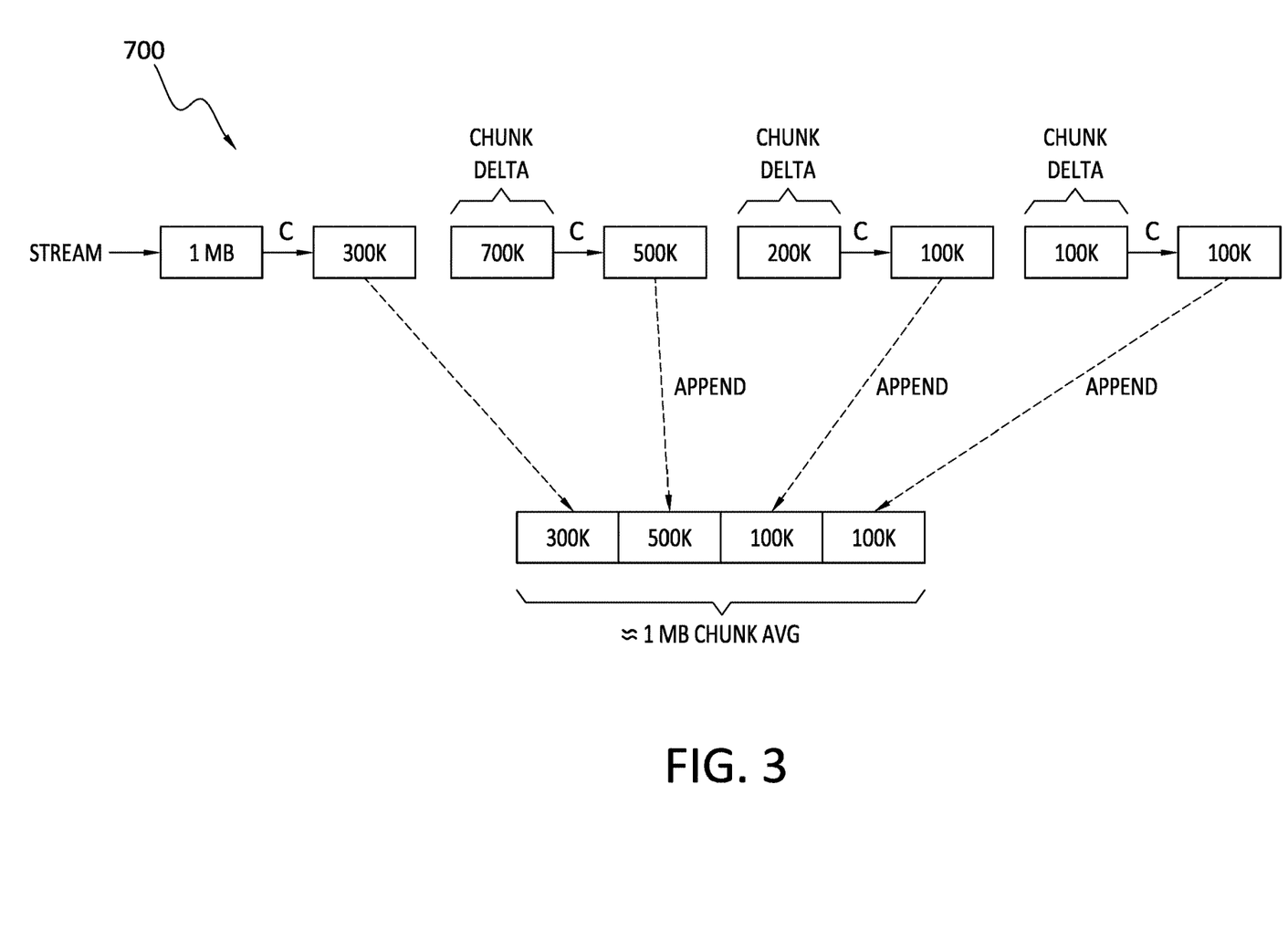
FIG. 3 discloses aspects of an example chunk and associated elements created with a compression aware chunking process.

With attention now to FIG. 3, details are provided concerning compression-based chunking of a data stream 700, one example of which is a data stream received by a datacenter from a client. As shown, a user may specify a particular average chunk size, that is, the compressed average chunk size. The particular average chunk size may be specified in bytes, although that is not necessarily required, and can be selected based on various considerations. For example, the average chunk size may be selected so as to make most efficient use of storage allocated to the user. Additional or alternative considerations may inform selection of the average chunk size. In the illustrated example, the average chunk size is specified to be 1 MB, although larger or smaller average chunk sizes can be specified.

As shown in FIG. 3, a first chunk of the data stream 700 may have an uncompressed size of 1 MB. After compression, the first chunk may be reduced to a size of 300 KB. Thus, a 'chunk delta' of 700 KB is defined, that is: average chunk size 1 MB−300 KB=700 KB. Accordingly, one or more additional chunks must be read from the data stream and processed before a chunk of about the average chunk size of 1 MB can be created. That is, additional chunks of the data stream must be read and compressed until the compressed aggregate size of the one or more additional chunks is about 700 KB.

In more detail, a next chunk of the data stream may have, for example, an uncompressed size of about 700 K. After compression, the second chunk may have a size of about 500 KB. The compressed chunk of 500 KB may then be appended to the previous compressed chunk of 300 KB, such that an aggregate size of the compressed chunk is about 800 KB, that is, 300 KB+500 KB. However, the 800 KB size is still smaller than the specified average chunk size of 1 MB and, as such, the 800 KB of data may be referred to herein as an incomplete chunk since 800 KB<1 MB average chunk size. Put another way, there remains a chunk delta of 200 KB, that is, 1 MB−800 KB. Accordingly, one or more additional chunks will have to be read and processed in order to produce a compressed chunk having a size that is about the average chunk size of 1 MB.

The next example chunk in the data stream may have an uncompressed size of 200 KB. After compression, the size of the 200 KB chunk may be reduced to 100 KB. The compressed chunk of 100 KB may then be appended to the compressed chunk of 800 KB (that is, the aggregate chunk made up of the compressed 300 KB+500 KB chunks), such that an aggregate size of the compressed chunk is now about 900 KB. Again, however, the resulting aggregate compressed size, that is, 900 KB, is still smaller than the specified average chunk size of 1 MB. Accordingly, one or more additional chunks will have to be read and processed in order to produce a compressed chunk having a size that is about the average chunk size of 1 MB.

In the illustrated example, one additional data stream chunk is read. For the sake of illustration, it is assumed that the additional data stream chunk of 100K is effectively uncompressible, and thus retains its nominal size of 100 KB. The chunk of 100 KB may then be appended to the compressed chunk of 900 KB (that is, the aggregate chunk made up of the compressed 300 KB+500 KB+100 KB chunks), such that an aggregate size of the compressed chunk is now about 1 MB, that is, about the average chunk size that was initially specified. At this point, a chunk boundary can then be declared, that is, the beginning and the end of the compressed 1 MB chunk are now defined and the aggregate total of the compressed 300 KB+500 KB+100 KB+100 KB chunks can be declared to constitute a chunk. The declared chunk can then be stored and/or otherwise processed by the data center or other entity.

In connection with the foregoing, it is noted that as a practical matter, the data that is read after a 'chunk delta,' such as the chunk delta of 700K, is determined, will typically exceed the size of the 'chunk delta' since it is assumed that the data that is read will compress to some extent. Thus, the chunk delta may be the minimum size of data that would be read. To illustrate, where a chunk delta is determined to be 700K, and depending upon the type of compression performed and the type of data that has been read, the amount of data read may be >700K.

By reading data that is >than the preceding calculated value of the chunk delta, the number of iterations necessary to generate a chunk that is greater than, or equal to, the specified average chunk size may be reduced. For example, if the chunk delta is 700K, the amount of data that is read may be 900K, so as to account for the fact that the 900K will compress to a smaller size which may be greater, or less, than the chunk delta of 700K. To avoid the former circumstance, the approach shown in FIG. 3 may be taken, that is, the amount of data read is 700K so as to ensure that the post-compression size does not exceed the chunk delta, that is, 700K.

In at least some embodiments, additional chunks are read from the data stream until an aggregate size of the compressed chunk is equal to, or larger, than the specified average chunk size. Thus, if the aggregate size of the compressed chunk is smaller than the specified average chunk size, one or more additional uncompressed chunks will be read until the aggregate size of the compressed chunk is at least as large as the specified average chunk size.

As noted in the discussion of FIG. 3, and average chunk size may be specified by a user. However, embodiments of the invention are not limited to any particular average chunk size. Moreover, there is no requirement or limitation that the same average chunk size be specified for an entire data stream or for any particular portion of a data stream. Thus, for example, a user may specify different average chunk sizes for different portions of the data stream. One or more different average chunk sizes can be specified on any basis, examples of which include, but are not limited to, file, file size, file type, client identity, and application. Correspondingly, an average chunk size may be specified without reference to any particular basis.

Moreover, an average chunk size can be varied dynamically within a data stream, that is, the average chunk size can be varied, or 'tuned,' inline with reception of the data stream such that a single data stream may be associated with one or more different average chunk sizes. As well, the average chunk size can be varied from one data stream to another.

With continued reference to the example of FIG. 3, further details are provided concerning some examples of chunking logic and data compression. In particular, a cloud gateway may read "Chunk_delta" (or simply 'Chunk Delta' in FIG. 3) worth of data from the incoming stream in conjunction with chunking logic, such as Rabin-Karp, Sticky Byte, or other, to selectively read data from the incoming data stream such that the final compressed chunk size is with a certain percentage limit of "Chunk_Avg." More particularly, the cloud gateway, or other entity, uses dynamic compression library to compress the chunk. To this end, a dynamic compression library provides prefix codes based on entropy of various symbols found in a "Chunk_Avg" amount of data. That is, the entropy encoding provides for a lossless data compression scheme. The Chunk_Avg size may be a minimum desired or acceptable size for a compressed data chunk.

An example of entropy coding creates and assigns a unique prefix-free code to each unique symbol, such as a word for example, that occurs in the input data stream. This type of entropy encoder then compresses the data by replacing each fixed-length input symbol with the corresponding variable-length prefix-free output codeword. As such, the length of each codeword is approximately proportional to the negative logarithm of the probability. Correspondingly, the most common symbols use the shortest codes.

In embodiments of the present invention, the data compression may be performed by a dynamic compressor, also referred to herein as simply a compressor, which compresses the "Chunk_delta" worth of bytes using a previously created prefix code and creating new prefix codes for new symbols detected in the "Chunk_delta" bytes. In more detail, the dynamic compressor may access a compression library, which may reside at the datacenter and/or form an element of a backup application, and identifies symbols, such as words for example, from an input data string. The compressor then checks which symbols are occurring relatively more frequently in the data stream. The compressor may then assign the smallest prefix code to the symbol that occurs the most frequently in the data stream. Since the most frequently occurring symbols have the smallest respective prefix codes, the input data string or data stream gets compressed.

The dynamic compressor then appends the compressed data to the previously compressed chunk, as described in the discussion of FIG. 3. The newly detected symbols in the "Chunk_delta" bytes may also be merged with the compression header and the cycle repeats until the final compressed chunk size is within some specified error margin of "Chunk_Avg." as explained earlier.

D. Aspects of Example Methods

Figure 4:
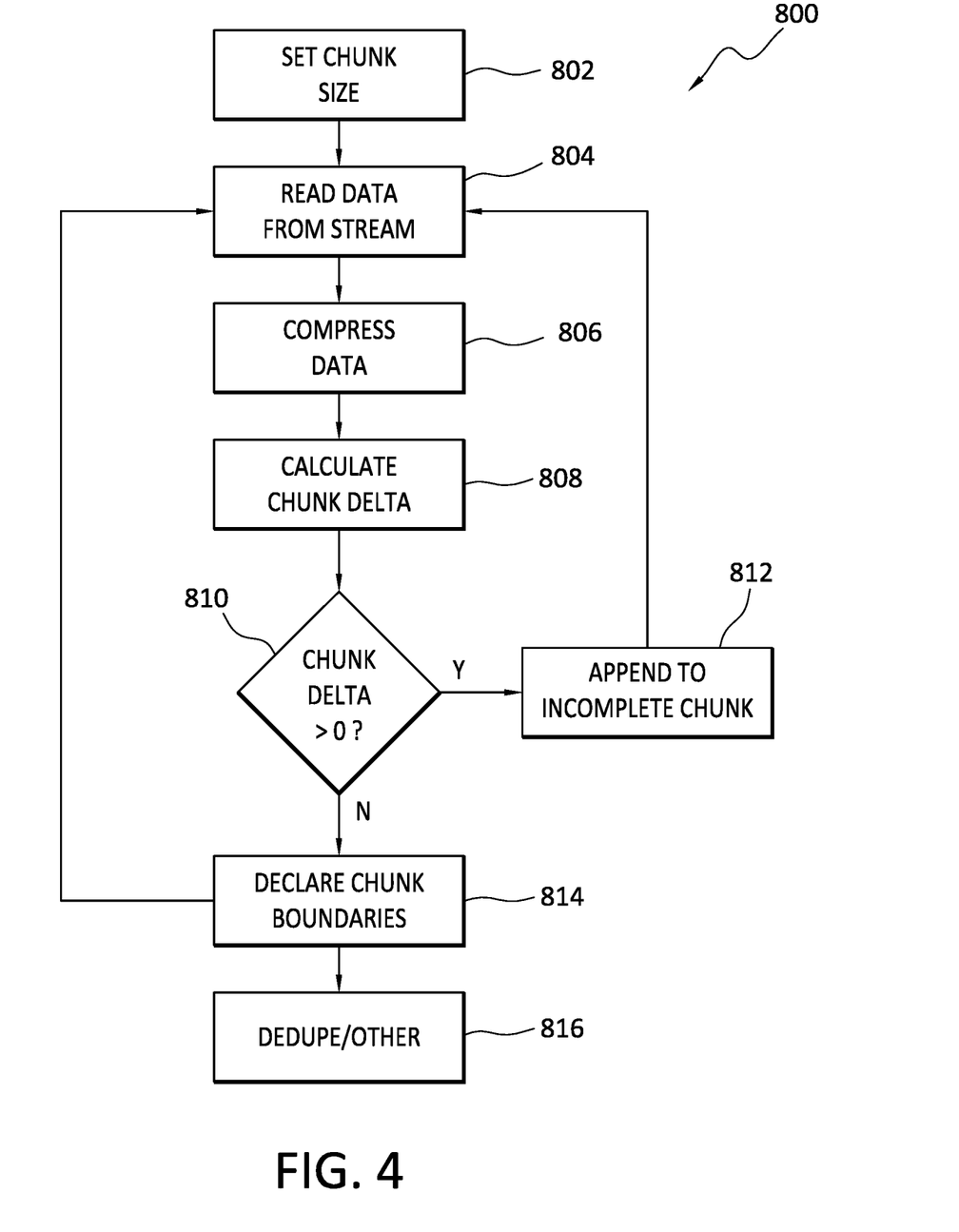
FIG. 4 is a flow diagram that discloses aspects of an example compression aware chunking method in accordance with various embodiments of the invention.

With attention now to FIG. 4, details are provided for some example methods for compression based chunking processes, one example of which is denoted generally at 800. In general, example methods such as the method 800 may be performed by and/or at a datacenter, backup application, or other application or entity. The methods provide for a data stream chunking process that is based at least in part on the compression, and compressibility, of the data in the data stream. For example, the compressibility of the data is employed as a basis for defining and creating compressed data chunks of a particular size or sizes and, thus, declaration of the boundaries of those data chunks. Once the chunk boundaries have been declared, the chunk can be deduplicated and/or subjected to further processing. In contrast, conventional approaches to data chunking do not consider or account for the compressibility of the data when chunking a data stream.

With particular attention now to the example method 800, a chunk average size 'chunk_avg' may be set 802 by a user or an application. The chunk average size may be set 802 at a backup server, datacenter, and/or other entity/location. After the chunk average size has been set 802, data from the data stream may be read 804. The amount of data read during any particular read process 804 may be a function of the chunk average size and/or a 'chunk_delta' value.

The data that has been read 804, which may comprise, or consist of, one or more chunks, may then be compressed 806. Example compression schemes are disclosed herein, however, the scope of the invention is not limited to any particular type of compression. After the data has been compressed 806, a chunk delta is calculated 808. Calculation of the chunk delta is performed by subtracting, from the specified average chunk size, the size of the most recently compressed chunk+the size of any incomplete chunk that exists. To illustrate, suppose that the specified average chunk size is 1 MB, the size of the most recently compressed chunk is 200 KB, and the size of the incomplete chunk is 400 KB. Appending the 200 KB to the 400 KB would produce an incomplete chunk of 600 KB, which results in a chunk delta of 400 MB (1 MB−(200 KB+400 KB)).

If the chunk delta is determined 810 to be greater than 0, then the most recently compressed chunk is appended 812 to the incomplete chunk, and the process 800 returns to 804 where additional data is read. The amount of additional data that is read may be the same as, greater than, or less than, the chunk delta. Where the chunk delta is determined 810 to be greater than 0, but no incomplete chunk exists yet, the compressed chunk that was created at 806 constitutes the first portion of a new incomplete chunk.

The process described above may iterate until such time as the chunk delta is determined 810 to be no greater than 0. The fact that no positive chunk delta remains indicates that a compressed chunk having a size at least as large as the chunk average size has been created. Accordingly, the boundaries of the compressed chunk may then be declared 814. The process 800 may then return to 804 to begin reading data for assembling into a new compressed chunk. After the boundaries of the compressed chunk have been declared 814, the compressed chunk may be deduplicated 816 and/or subjected to other processing at the datacenter and/or elsewhere.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   reading a data chunk from a data stream;
   compressing the data chunk;
   calculating a chunk delta;
   when the chunk delta is greater than zero, appending the compressed data chunk to an incomplete data chunk, and the compressed data chunk is appended to the incomplete chunk even when a size of the compressed data chunk is larger than the chunk delta; and
   when the chunk delta is not greater than zero, declaring boundaries of a completed and compressed data chunk having a size at least as large as a minimum size.

2. The method as recited in claim 1, further comprising setting the minimum chunk size.

3. The method as recited in claim 1, wherein the completed and compressed data chunk includes an uncompressed data chunk.

4. The method as recited in claim 1, wherein the chunk delta is a difference between the minimum size and a sum of a size of the compressed data chunk and a size of the incomplete data chunk.

5. The method as recited in claim 1, wherein a size of the incomplete data chunk is greater than or equal to zero.

6. The method as recited in claim 1, wherein calculation of the chunk delta is based in part on a size of the compressed data chunk.

7. The method as recited in claim 1, further comprising deduplicating the completed and compressed data chunk.

8. The method as recited in claim 1, wherein the method is repeated until the chunk delta is not greater than zero.

9. The method as recited in claim 1, wherein a location of one of the boundaries is determined by a size of a final data chunk appended before the boundaries were declared.

10. The method as recited in claim 1, wherein an amount of data read from the data stream is based on a chunk delta value.

11. A non-transitory storage medium having stored therein computer-executable instructions which are executable by one or more hardware processors to perform operations comprising:
    reading a data chunk from a data stream;
    compressing the data chunk;
    calculating a chunk delta;
    when the chunk delta is greater than zero, appending the compressed data chunk to an incomplete data chunk, and the compressed data chunk is appended to the incomplete chunk even when a size of the compressed data chunk is larger than the chunk delta; and when the chunk delta is not greater than zero, declaring boundaries of a completed and compressed data chunk having a size at least as large as a minimum size.

12. The non-transitory storage medium as recited in claim 11, wherein the operations further comprise setting the minimum chunk size.

13. The non-transitory storage medium as recited in claim 11, wherein the completed and compressed data chunk includes an uncompressed data chunk.

14. The non-transitory storage medium as recited in claim 11, wherein the chunk delta is a difference between the minimum size and a sum of a size of the compressed data chunk and a size of the incomplete data chunk.

15. The non-transitory storage medium as recited in claim 11, wherein a size of the incomplete data chunk is greater than or equal to zero.

16. The non-transitory storage medium as recited in claim 11, wherein calculation of the chunk delta is based in part on a size of the compressed data chunk.

17. The non-transitory storage medium as recited in claim 11, wherein the operations further comprise deduplicating the completed and compressed data chunk.

18. The non-transitory storage medium as recited in claim 11, wherein the operations are repeated until the chunk delta is not greater than zero.

19. The non-transitory storage medium as recited in claim 11, wherein a location of one of the boundaries is determined by a size of a final data chunk appended before the boundaries were declared.

20. The non-transitory storage medium as recited in claim 11, wherein an amount of data read from the data stream is based on a chunk delta value.

* * * * *